United States Patent
Fujioka et al.

(10) Patent No.: US 7,471,929 B2
(45) Date of Patent: Dec. 30, 2008

(54) DEVICE AND METHOD FOR TELEPHONE COUNTERMEASURE IN USING TELEPHONE DURING DRIVING

(75) Inventors: Ryoji Fujioka, Kyoto (JP); Tanichi Ando, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 10/586,848

(22) PCT Filed: Jan. 20, 2005

(86) PCT No.: PCT/JP2005/000669

§ 371 (c)(1),
(2), (4) Date: Jul. 20, 2006

(87) PCT Pub. No.: WO2005/069675

PCT Pub. Date: Jul. 28, 2005

(65) Prior Publication Data

US 2007/0120948 A1    May 31, 2007

(30) Foreign Application Priority Data

Jan. 20, 2004   (JP)   ............... 2004-011838

(51) Int. Cl.
*H04M 1/00* (2006.01)
(52) U.S. Cl. .............. 455/73; 455/569.2; 382/118
(58) Field of Classification Search .......... 455/1, 455/456.4, 569.1–569.2, 344–345, 99, 412.2, 455/420; 382/118
See application file for complete search history.

(56) References Cited

U.S. PATENT DOCUMENTS

| 6,556,810 | B2 | 4/2003 | Suzuki | |
|---|---|---|---|---|
| 6,771,946 | B1* | 8/2004 | Oyaski | 455/345 |
| 7,116,803 | B2* | 10/2006 | Lemelson et al. | 382/118 |
| 2003/0032460 | A1* | 2/2003 | Cannon et al. | 455/569 |
| 2004/0077339 | A1* | 4/2004 | Martens | 455/414.1 |

(Continued)

FOREIGN PATENT DOCUMENTS

JP   2001-197556   7/2001

(Continued)

OTHER PUBLICATIONS

Author.*

(Continued)

*Primary Examiner*—Simon D Nguyen
(74) *Attorney, Agent, or Firm*—Osha • Liang LLP

(57) ABSTRACT

[Problems] There are provided a device and a method for telephone countermeasure in using a telephone during driving which can automatically suppress communication of only a driver in a vehicle.

[Means For Solving Problems] The device for telephone countermeasure includes a database (3), a driver judgment unit, and a mode switching unit. The database (3) contains driver face data (3-1) and a telephone number (3-2) of a mobile telephone (7) used by the driver for each of the drivers. The driver judgment unit identifies the current driver of the vehicle in the database (3) by the face authentication. The mode switching unit extracts the telephone number (3-2) of the mobile telephone (7) used by the identified driver from the database (3) and switches the mobile telephone (7) of the driver to a drive mode such as a message recording mode by using the telephone number.

13 Claims, 10 Drawing Sheets

U.S. PATENT DOCUMENTS

2004/0209594 A1* 10/2004 Naboulsi .................. 455/404.1
2004/0214596 A1* 10/2004 Lee ......................... 455/552.1
2007/0182529 A1*  8/2007 Dobler et al. ............... 340/438

FOREIGN PATENT DOCUMENTS

| JP | 2003-102058 | | 4/2003 |
| --- | --- | --- | --- |
| JP | 2003-179683 | | 6/2003 |
| JP | 2005056000 A | * | 8/2003 |
| JP | 2003-281099 | | 10/2003 |
| WO | 01/08328 | | 2/2001 |

OTHER PUBLICATIONS

International Search Report for PCT/JP2005/000669 dated Apr. 19, 2005 (2 pages).
Patent Abstracts of Japan 2003-179683 dated Jun. 27, 2003 (2 pages).
Patent Abstracts of Japan 2003-281099 dated Oct. 3, 2003 (2 pages).
Patent Abstracts of Japan 2003-102058 dated Apr. 4, 2003 (2 pages).
English Patent Abstract of JP2001197556 from esp@cenet, published Jul. 19, 2001, 1 page.
Mechanical English translation from www4.ipdl.inpit.go.jp for Japanese Patent Application No. 2001-197556, Publication Date: Jul. 19, 2001, 25 pages.

* cited by examiner

FIG. 7
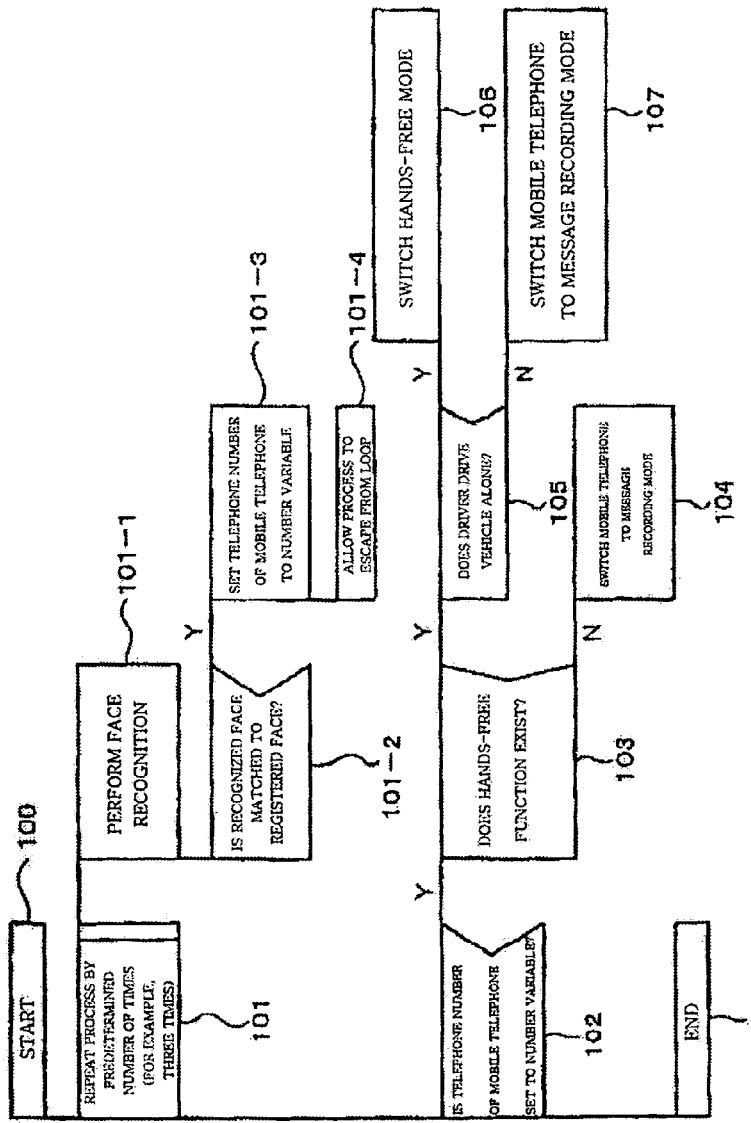
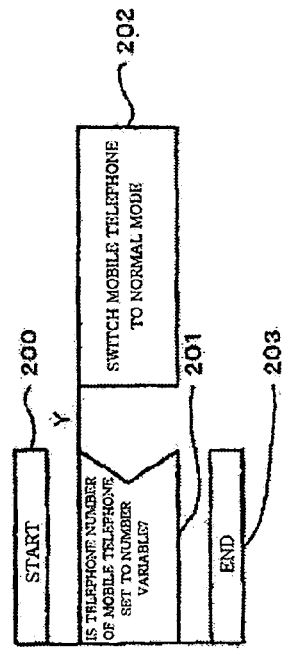

OPERATION OF MOBILE TELEPHONE

PROCESS FOR SWITCHING TO MESSAGE RECORDING MODE

PROCESS FOR SWITCHING TO HANDS-FREE MODE

FACE RECOGNITION AND
REGISTRATION CONFIRMATION

CONTROL OF LOCAL AREA COMMUNICATION

FACE DATA CORRESPONDENCE TABLE

| ID OF INDIVIDUAL | FACE DATA |
|---|---|
| ID 11001 | FACE DATA 11 |
| ID 11002 | FACE DATA 12 |
| ID 11003 | FACE DATA 13 |

MOBILE TELEPHONE NUMBER CORRESPONDENCE TABLE

| ID OF INDIVIDUAL | MOBILE TELEPHONE INFORMATION |
|---|---|
| ID 11001 | MOBILE TELEPHONE INFORMATION 11 |
| ID 11002 | MOBILE TELEPHONE INFORMATION 12 |
| ID 11003 | MOBILE TELEPHONE INFORMATION 13 |

DEVICE AND METHOD FOR TELEPHONE COUNTERMEASURE IN USING TELEPHONE DURING DRIVING

TECHNICAL FIELD

The present invention relates to a device and method for telephone countermeasure in using telephone during driving which can automatically suppress communication in a vehicle.

BACKGROUND ART

Recently, as a mobile telephone has been popularized, communication of a driver during driving has been problematic. In consideration of this problem, the communication using a mobile telephone during driving is legally prohibited, but many drivers do not observe the law. As a method for solving such a problem, an invention for automatically switching a mobile telephone registered previously to a message recording mode when it is detected that a user is driving a vehicle has been applied for patent (for example, see Patent Document 1). In addition, an invention for generating distributing wave in a vehicle so as to prevent communication in a vehicle is applied (for example, see Patent Document 2).

However, in the conventional methods, communication of a fellow passenger as well as communication of the driver may be suppressed. The communication of only the driver in the vehicle need be suppressed and the communication of the fellow passenger need not be suppressed. In addition, when a driver whose mobile telephone number is registered sits on a passenger seat, the communication of the driver's telephone need not be suppressed.

[Patent Document 1] JP-A-2001-197556
[Patent Document 2] WO 01/08328

DISCLOSURE OF THE INVENTION

Problems to be Solved by the Invention

The present invention is contrived to solve the above-mentioned problems and an object of the present invention is to provide a device for telephone countermeasure during driving and a method for telephone countermeasure during driving, which is very suitable for automatically and efficiently suppressing communication of only a driver.

Means for Solving the Problems

In order to accomplish the above-described object, there is provided a device for telephone countermeasure during driving, including: a database which registers face data of a driver and identification information of a mobile communication device used by the driver for each of drivers; a driver identifying means which identifies current driver of a vehicle in the database by face recognition; and a mode switching means which extracts the identification information of the mobile communication device used by the driver identified by the driver identifying means and switches the mobile communication device of the driver to a drive mode using the identification information.

In the present invention, the current driver of the vehicle is identified in the database by the face authentication, the identification information of the mobile communication device used by the identified driver is extracted from the same database, and the mobile telephone of the driver is switched to the drive mode such as a message recording mode using the extracted identification information. Accordingly, since the mobile communication device of the driver is automatically switched to the drive mode such as the message recoding mode during driving, it is possible to efficiently suppress the communication of the driver during driving. In addition, when a person who is registered as the driver in the data base does not drive the vehicle, the person can freely use his/her mobile communication mobile device, and, only when the person actually drives the vehicle as the driver, his/her mobile communication device is automatically switched to the drive mode such as the message recording mode to suppress the communication.

In the present invention, when the driver cannot be identified by the lapse of a predetermined time after the mobile communication device is automatically switched to the drive mode such as the message recording mode to suppress the communication, it is judged that the driver gets out of the vehicle, and thus the drive mode of the mobile communication device is released such that the drive mode returns to the state prior to the drive mode. To this end, the mobile communication device can be used in a normal mode. That is, since the communication using the mobile communication device of the driver is inhibited only during driving, the drive mode such as the message recoding mode is released when the vehicle stops.

When the releasing of the drive mode is repeated whenever the vehicle stops by a traffic signal, the communication may start in a signal standby state. Accordingly, the drive mode may be released by selecting a condition from the lapse of a predetermined time after the vehicle stops, stopping of the engine, or opening of the door, in addition to the stopping of the vehicle.

The "drive mode" includes a message recording mode and a hands-free mode, which is automatically selected as needed. The "message recording mode" includes a mode for temporarily keeping a mail in a telephone station or a mail center without connection with a mobile telephone or a mode for transmitting information that the user of the mobile telephone cannot answer to a person who calls the telephone number of the mobile telephone, even when the mail or communication call is transmitted to the mobile telephone. The "drive mode" further includes a mode for suppressing the driver from driving the vehicle in an unstable state such as one-handed driving state due to transmission/reception of the call or the mail.

The "hands-free mode" means a mode that the communication is performed using the mobile telephone without using hands. The hands-free mode, for example, includes a mode that the voice of the driver is picked up by a microphone and transmitted to the mobile telephone of the driver and the voice of a communication counterpart is heard by a speaker or the other mode that the driver talks over the mobile telephone without using his/her hands.

When a hands-free function is not included in the vehicle, switching to the hands-free mode cannot be performed. When the hands-free function is included, switching to the hands-free mode or the message recoding mode can be selectively performed. This selection may be set such that the switching to the hands-free mode is performed when the entire interior of the vehicle is photographed using a camera and it is judged that only the driver exists in the vehicle based on the photographed image, in addition to a method for allowing the driver to perform the switching using a switch.

The "face data of the driver" means data for identifying the face of the driver such as face feature data of the driver which is registered in the database as the face data of the driver.

The "identifying current driver of the vehicle in the database by face recognition" includes detecting a face region for a face image of the driver, which is photographed using the camera, extracting a feature point of the face of the driver based on the detected result, sequentially comparing the data of the feature point with the face feature data of the driver which is registered in the database as the face data of the driver, and judging that, among the persons having similarities exceeding a predetermined similarity, a most similar driver is determined to the current driver of the vehicle. Accordingly, a driver having a similarity less than the predetermined similarity is excluded from candidates of the current driver of the vehicle. When a plurality of driver candidates exist, the driver having a highest similarity is selected and determined to the current driver of the vehicle.

The "mobile communication device" includes a mobile telephone, a PHS, a PDA or the mobile communication device.

The "identification information of the mobile communication device" includes the telephone number of the mobile telephone. In this case, the telephone number is registered in the database and the mobile telephone of the driver is switched to the drive mode using the telephone number. The switching to the drive mode may be performed by an identification number other than the telephone number. In this case, the identification number of the mobile telephone is registered in the database, instead of the telephone number. When the mobile telephone is directly communicated with the vehicle to switch the mode thereof to the drive mode using Bluetooth or UWB as a local area communication means, an identifier used in the communication means is registered in the database.

When the mobile communication device of the driver is switched to the drive mode, the keyboard of the mobile communication device cannot be manipulated and the display screen of the mobile communication device may be set to an invalid state. By this configuration, it is possible to efficiently prevent an illegal action such as an action in which a user who ignores the law or danger and uses the mobile telephone manually releases the drive mode and to surely prevent the driver from using the mobile telephone during driving.

EFFECT OF THE INVENTION

In the present invention, the following effects can be obtained by the above-described configuration.

(1) Since only a mobile communication device of a driver is automatically switched to a drive mode such as a message recoding mode during driving, it is possible to efficiently suppress the driver from performing communication during driving.

(2) There is no problem that a mobile telephone of a person who does not drive a vehicle is switched to the drive mode such as the message recording mode, and only a mobile telephone of a driver who actually drives the vehicle can be switched to the drive mode.

BEST MODE FOR CARRYING THE INVENTION

Hereinafter, a preferred embodiment of the present invention will be described in detail with reference to the accompanying drawings.

As shown in FIG. 1, a device for telephone countermeasure during driving according to the present embodiment includes a camera 1, an illumination 2, a database 3, an image processing unit 4, a vehicle controller unit 5 and a communication device 6.

The camera 1 is connected to the image processing unit 4 and controlled by a camera controlling unit 404 (see FIG. 2) in the image processing unit 4 to photograph the face of a driver who sits on a driving seat and the vicinity thereof. Accordingly, the camera 1 is disposed at a position for photographing the face of the driver, for example, a front side of the driving seat.

The illumination 2 is connected to the image processing unit 4 and controlled by an illumination controlling unit 4-5 (see FIG. 2) in the image processing unit 4 to illuminate the face of the driver when photographing the driver, thereby allowing a preferred photographing condition to be obtained.

The database 3 exists in a non-volatile memory or hard disk drive (HDD) and is connected to the image processing unit 4 to be accessed from the image processing unit 4 or the vehicle controller unit 5. In the database 3, face data 3-1 of the driver and a telephone number 3-2 of a mobile telephone 7 used by the driver are registered for each of the registered drivers. The face data 3-1 of the driver registered in the database 3 is used when current driver of the vehicle is identified in the below-described process for identifying the driver in the image processing unit 4 and the telephone number 3-2 registered in the database 3 is used when the mobile telephone 7 of the driver is switched to a message recording mode in the below-described process for switching to a drive mode in the vehicle controller unit 5.

In the database 3 of FIG. 1, one telephone number is registered with respect to one piece of face data 3-1. However, since one driver may possess a plurality of mobile telephones, a plurality of telephone numbers may be registered with respect to one piece of face data 3-1 in the database 3 of FIG. 1.

Face feature data is contained in the face data 3-1 of the driver, which is registered in the database 3. The face feature data is necessary for identifying the driver and includes data representing a central portion or an end point of an organ, such as eye, nose or mouth, which is extracted from an original image of the face of the driver. Data representing the feature of the face which is viewed from a different viewpoint may be used.

The image processing unit 4, as shown in FIG. 2, is configured by using hardware resources such as a CPU 4-1, a RAM 4-2, a ROM 4-3, the camera controlling unit 4-4 for controlling the camera 1 of FIG. 1 and the illumination controlling unit 4-5 for controlling the illumination 2 of FIG. 1. The RAM 4-2 stores a variable in the process of the CPU 4-1 or image data photographed by the camera 1. The ROM 4-3 stores an image processing program, etc. The CPU 4-1 executes the program stored in the ROM 4-3. To this end, the image processing unit 4 functions as a device having an image reading unit 4A for reading an image from the camera or a driver judgment unit 4B for identifying current driver of the vehicle by face authentication, as shown in FIG. 3.

The image reading unit 4A of the image processing unit 4 controls the camera 1 through the camera controlling unit 4-4, controls the illumination 2 through the illumination controlling unit 4-5, and inputs face image of the driver photographed by the camera 1 to the RAM 4-2 as data. The face image of the driver, which is input herein, is used when the driver is identified in the driver judgment unit 4B.

In the driver judgment unit 4B of the image processing unit 4, the process for recognizing the face of the driver and identifying the current driver of the vehicle based on the recognized face of the driver is performed.

In the face recognition of the driver judgment unit 4B, a face region is detected from the face image of the driver photographed by the camera 1 and a feature point of the face of the driver is extracted based on the detected result.

In a method for detecting the face region, a graph having a facial form may be used. In this method, the face image of the driver is scanned while expanding/reducing the graph and a point of the face image which is suitable for the graph is detected as the face region of the driver. The face region may be detected by a detecting method other than this method.

The feature point of the face is obtained by extracting an organ such as eye, nose or mouth in the detected face region and calculating data related to a position of the central portion or the end-point of each organ.

The identification of the driver of the driver judgment unit 4B is a process for judging whether a person corresponding to the face of the driver recognized in the previous process is registered in the database 3 as the driver. More specifically, in this process, the data on the feature point of the face extracted in the previous process is sequentially compared with feature data of the face of the driver registered in the database 3 as the face data 3-1 of the driver and a most similar driver is determined to the current driver of the vehicle among the persons having similarities exceeding a predetermined similarity. When the driver cannot be identified, it is considered that a photographing condition is poor and thus a series of processes from the face recognition to the identification of the driver is repeated several times (for example, three times).

The vehicle controller unit 5, as shown in FIG. 4, is configured by using hardware resources such as a CPU 5-1, a RAM 5-2, a ROM 5-3 and an I/F unit 5-4. In the ROM 5-3 of the vehicle controller unit 5, a program including a telephone mode setting process shown in FIG. 7(a) and a mode releasing process shown in FIG. 7(b) are stored in addition to a general program on vehicle control. The CPU 5-1 of the vehicle controller unit 5 executes the telephone mode setting process and the mode releasing process stored in the ROM 5-3 as well as the general program stored in the ROM 5-3. The RAM 5-2 of the vehicle controller unit 5 stores a variable in the process of the CPU 5-1.

The vehicle controller unit 5 functions as a device including a vehicle information acquiring unit 5A, a process start judgment unit 5B, a mode switching unit 5C and a process completion judgment unit 5D by executing the program using the CPU 5-1, as shown in FIG. 5.

The vehicle information acquiring unit 5A of the vehicle controller unit 5 acquires a signal output from sensors 8 connected to the vehicle controller unit 5 or vehicle information such as fastening/releasing of a seat belt, opening/closing of a vehicle door, the state of a hand brake, the position of a transmission, a vehicle speed output from controllers 9 connected to the vehicle controller unit 5. The vehicle information acquiring unit 5A also acquires existence of a hands-free function as the vehicle information. Accordingly, in relation to the acquirement of the vehicle information, it is considered that the sensors 8 include at least a sensor for detecting the fastening/releasing of the seat belt, a sensor for detecting the opening/closing of the vehicle door, a sensor for detecting the state of the hand brake, a sensor for detecting the position of the transmission, and a sensor for detecting the vehicle speed. Information on the position of the transmission may be obtained by a transmission controller and, in this case, information on the position of the transmission may be acquired from the controller. The transmission controller is included in the controllers 9 of the vehicle.

The process start judgment unit 5B of the vehicle controller unit 5 judges whether a process related to the device for telephone countermeasure during driving (hereinafter, referred to as "present process") in the vehicle controller unit 5 starts, based on the vehicle information acquired by the vehicle information acquiring unit 5A. More specifically, this judgment is performed as the process of the CPU 5-1 of the vehicle controller unit 5. In the basic concept of this judgment, when the fastening of the seat belt of the driver is detected in the vehicle information acquiring unit 5A, it is judged that the CPU 5-1 of the vehicle controller unit 5 starts the present process. The telephone mode setting process of FIG. 7(a) is performed by this judgment. Accordingly, the fastening of the seat belt of the driver is a process start condition of the telephone mode setting process. The process start judgment unit 5B instructs the image processing unit 4 to start to read an image when the process start condition of the telephone mode setting mode is satisfied. More specifically, this instruction is given from the CPU 5-1 of the vehicle controller unit S to the image processing unit 4 through the I/F unit 5-5.

When the telephone mode setting process of FIG. 7(a) starts, the process for photographing the face of the driver using the camera and identifying the current driver of the vehicle is performed. When the identification of the driver is completed, since the driver need not be observed by the camera, the driver may be photographed and judged at a point of time when a driver who actually drives the vehicle is decided. To this end, in the present embodiment, the fastening of the seat belt of the driver is considered to the process start condition of the telephone mode setting process of FIG. 7(a). However, since a driver who does not fasten the seat belt exists, it may be judged that the telephone mode setting process of FIG. 7(a) starts when the vehicle information acquiring unit 5A detects that an engine starts, the hand brake is released and the transmission is operated. Instead of the above-described process start condition, an element decided by the driver of the vehicle may be set as the process start condition.

Using the starting of the engine as the element of the process start condition is to prevent a problem that, if only the releasing of the hand brake and the position of the transmission are used as the process start condition, the telephone mode setting process of FIG. 7(a) may start even when the vehicle is stopping in a state that the hand brake is released and the transmission is operated in a snowy region.

The above-described process start condition of the telephone mode setting mode is only exemplary, and other than the condition, the telephone mode setting process of FIG. 7(a) may start using a condition having a high probability that the vehicle starts.

The mode switching unit 5C of the vehicle controller unit 5 aims at the driver who is identified in the driver judgment unit 4B, that is, the driver who is identified as a person who currently drives the vehicle among the drivers registered in the database 3, and switches the mobile telephone 7 used by the driver to a drive mode such as a message recording mode or a hands-free mode. More specifically, this switching is executed as the process of the CPU 5-1 of the vehicle controller unit 5. When the vehicle information acquiring unit 5A detects that the hands-free function is not included, the process for switching to the hands-free mode is not performed.

When the mobile telephone 7 used by the current driver of the vehicle is desired to be switched to the message recording mode, the telephone number of the mobile telephone 7 used by the driver must be identified. Since the telephone number is registered in the database 3 for each the registered drivers, the telephone number 3-2 of the mobile telephone 7 used by the driver can be specified from the database 3 in the mode switching unit 5C.

A method for switching the mobile telephone having the telephone number to the message recording mode after specifying the telephone number will briefly include the following methods (1), (2) and (3).

(1) The CPU 5-1 of the vehicle controller unit 5 transmits the telephone number of the mobile telephone 7, which is desired to be switched to the message recording mode, to a telephone station 10 as data using a communication device 6 equipped in the vehicle, and the telephone station 10 switches the mobile telephone 7 corresponding thereto to the message recording mode based on the transmitted telephone number.

(2) Instead of the telephone station 10, the telephone number is notified to an application service provider (ASP) for providing switching to the message recording mode as a service to switch the mobile telephone 7 corresponding to the telephone number to the message recording mode.

(3) The CPU 5-1 of the vehicle controller unit 5 allows communication to be performed between the vehicle and the mobile telephone using the communication device 6 equipped in the vehicle to switch the mobile telephone 7 to the message recording mode.

Now, the methods (1) to (3) will be described in detail.

In the method (1), the communication device 6 of the vehicle communicates with the telephone station 10 and transmits an identifier (telephone number) of the mobile telephone 7 corresponding to the driver registered in the database 3 to the telephone station 10. The telephone station 10 temporarily keeps a mail in the telephone station 10 without connection with the mobile telephone 7 or performs the message recording mode for transmitting information that the user of the mobile telephone 7 cannot answer to a person who calls the telephone number of the mobile telephone 7, based on the transmitted identifier, even when the mail or communication call is transmitted to the mobile telephone.

In order to suppress the transmission from the mobile telephone 7, the telephone station 10 transmits data representing the switching to the message recording mode to the mobile telephone 7, and the mobile telephone 7 receives this signal to be switched to the message recording mode and performs a process for stopping an input signal from a manipulation unit 7-1 (see FIG. 6) of the mobile telephone 7 in order to suppress sending or writing of a mail.

That is, when the switching to the message recording mode is performed, a mail cannot be written and sent or a received mail cannot be displayed through the manipulation unit 7-1 of the mobile telephone 7, thereby suppressing the use of the mail.

In general, the mobile telephone 7 communicates with the telephone station 10 using electric wave. The mobile telephone 7 extracts a communication signal from a carrier wave by detecting the electric wave received from the telephone station 10 through an antenna 7-2 using a receiving circuit 7-3, as shown in FIG. 6. In the mobile telephone 7, a communication mode switching unit 7-4 performs switching to voice communication or data communication according to the contents of the communication signal received by the receiving circuit 7-3. In the case of the voice communication, the communication signal is input to a sound input/output unit 7-5 to generate a ringing tone or to start conversation. Meanwhile, in the case of the data communication, the communication signal is input to a controlling circuit 7-6 to perform display on a display device 7-7 or to perform communication.

When the telephone station 10 performs the switching to the message recording mode, the telephone station 10 transmits a signal representing the data communication and then transmits data representing the switching to the message recording mode. The mobile telephone 7 performs the switching to a data mode according to such data and displays the switching to the message recording mode on the display device 7-7. In addition, in order to inform the user, who is the driver, of the switching of the mode, a sound is emitted by a speaker of the sound input/output unit 7-5.

The method (2) is basically similar to the method (1) except the subject of the service.

In the method (3), the communication device 6 and the mobile telephone 7 mounted in the vehicle are directly communicated with each other to perform the switching to the message recording mode. More specifically, a local area communication device or a circuit such as Bluetooth is provided in the vehicle and the mobile telephone, communication is performed by the local area communication device or circuit, and the mobile telephone 7 is switched to the message recording mode. In this case, the mobile telephone 7 receives electric wave emitted from the vehicle through a local area communication antenna 7-8 of the mobile telephone 7, detects the received signal by the local area communication circuit 7-9, and transmits the detected communication signal to the controlling circuit 7-6. The controlling circuit 7-6 switches the mobile telephone 7 to the message recording mode based on the received communication signal. At this time, since it may well be thought that a plurality of mobile telephones exists in the vehicle, the communication need be performed using the identifier obtained from the database 3, similar to the communication using the telephone station.

Although, in the present embodiment, the local area communication antenna 7-8 is separately provided, the local area communication antenna may be shared with the antenna 7-2 for performing the communication with the telephone station 10 by a communication frequency.

The above-described mode switching methods are exemplary and the mobile telephone 7 may be switched to the message recording mode by a method other than these.

Depending on the circumferences of the interior of the vehicle, it is selected whether the mobile telephone is switched to the message recording mode or the hands-free mode. That is, when the driver drives the vehicle alone, the switching to the hands-free mode is selected. In such a case, since a fellow passenger does not exist, there is no problem that a third party hears the conversation of a telephone counterpart although the conversation voice of the telephone counterpart is emitted in the vehicle. In the other case, the switching to the message recording mode is selected. As a method for detecting existence of the fellow passenger, in addition to a method for photographing the entire interior of the vehicle by the camera 1 of FIG. 1 and detecting whether the fellow partner exists or not based on the photographed image, a method for detecting the existence of the fellow partner using a seating sensor for detecting whether a person takes a seat in the vehicle may be employed. In addition, any method capable of detecting the existence of the fellow partner may be employed.

In the present embodiment, when the third party other than the driver exists, the switching to the hands-free mode is not performed. However, since the fellow partner is desired to participate in the communication according to communication contents, the hands-free mode may be selected according to the selection of the driver.

The process completion judgment unit 5D of the vehicle controller unit 5 judges whether the present process of the vehicle controller unit 5 is completed, based on the vehicle information acquired by the vehicle information acquiring unit 5A. This judgment is performed as the process of the CPU 5-1 of the vehicle controller unit 5. In addition, in this judgment, when the releasing of the driver from the seat belt and the stopping of the vehicle are detected by the vehicle information acquiring unit 5A, it is judged that the present process of the vehicle controller unit 5 is completed. Accordingly, two conditions including the releasing of the driver from the seat belt and the stopping of the vehicle become the process completion condition of the present process. Since the driver may not fasten the seat belt, the OFF or removal of an ignition key may be the process completion condition.

Here, the "stopping of the vehicle" means a state that there is no probability that the vehicle is immediately driven, such as stopping of the engine, pulling-up of the hand brake, and the neutral state of the transmission. This is because, when such probability disappears, the communication by the mobile telephone need not be suppressed.

Regardless of whether the driver is registered in the database 3, most of the present process of the vehicle controller unit 5 is completed at a point of time when the vehicle starts. The rest process is a returning process for returning to an original mode when the mobile telephone 7 of the driver is set to the message recording mode by the telephone mode setting process of FIG. 7(a) as the drive mode at a point of time when the driver gets out of the vehicle. Accordingly, when the above-described process completion conditions are satisfied and the mobile telephone 7 of the driver is switched to the message recording mode by the telephone mode setting process of FIG. 7(a), the mode releasing process of FIG. 7(b) is executed as a process for releasing the drive mode, the mobile telephone 7 of the driver returns to the original mode, and the present process is completed.

FIG. 13 is a view showing the configuration of the communication device 6 shown in FIG. 1. The communication device 6 is configured by hardware resources such as a CPU 6-2, a RAM 6-3, a ROM 6-4, a local area communication unit 6-5 and a wide area communication unit 6-6, all of which are connected to one another through a bus 6-1. In this configuration, the local area communication unit 6-5 functions as Bluetooth as a local area communication means. The wide area communication unit 6-6 functions as an information transmitting/receiving means for (1) requesting a correspondence between the driver who sits on the driving seat and the mobile telephone when the correspondence between the driver and the mobile telephone is ambiguous or (2) informing an external center of a fact obtained by an in-vehicle unit such as the vehicle controller unit 5. When the wide network communication unit 6-6 is not used, the wide network communication unit may be omitted.

The external center for inquiry using the wide area communication unit 6-5 may be the followings (A), (B), (C) or (D), but is not limited thereto.

(A) a personal computer which is provided at the driver's home and capable of performing communication (B) a mobile telephone service station or center (C) an Internet service provider (APS)

The APS also includes a storage service for storing data without identifying the contents of the data when the data of its employee is managed as well as when the service is specialized.

(D) the present device mounted in a different vehicle, in which a pair of data including the face data and the telephone number of the mobile telephone is registered in the database of the same device.

When the face data is registered without overlapping and the vehicle in which the present device is mounted is driven by employing the inquiry method (1), it is possible to realize the hands-free mode by receiving the information even when the information on the face data of the driver and the mobile telephone corresponding to the driver does not exist in the driven vehicle.

By employing the notifying method (2), it is possible to tabulate the record of the communication state as to who uses which mobile telephone at what time in the hands-free mode. In the other means, for example, in a method for identifying the driver using fingerprint authentication, the authentication operation may be forgotten. However, in the present device, since the face of the driver is automatically recognized, there is no room for forgetting the authentication operation, and, since the switching to the hands-free mode can be automatically performed, reliability of the tabulated result is high. When the record of the communication state is tabulated, it is possible to verify whether the driver performs the communication by the mobile telephone or in the hands-free mode when an accident happens. In the transportation business to which many drivers belongs, it is possible to manage the use of the mobile telephone during driving for each of the drivers.

Next, the entire process of the device for telephone countermeasure during driving according to the present embodiment will be described using the telephone mode setting process of FIG. 7(a) and the mode releasing process of FIG. 7(b).

If the process start condition of the present process such as the fastening of the seat belt of the driver is satisfied, the telephone mode setting process of FIG. 7(a) starts (step 100). The judgment as to whether the process start condition is satisfied is performed by the process completion judgment unit 5D of the vehicle controller unit 5, based on the vehicle information acquired by the vehicle information acquiring unit 5A of the vehicle controller unit 5 shown in FIG. 5.

Then, the face of the driver is recognized (step 101-1) and the driver is identified from the database 3 of FIG. 1, based on the recognized face of the driver. That is, it is judged whether the recognized face of the driver is matched to the face of the driver registered in the database 3 (step 101-2). If they are matched to each other, the telephone number of the mobile telephone 7 corresponding to the driver is extracted and set to a number variable (step 101-3), the process escapes from the loop (step 101-4) and progresses to the step 102. If they are not matched to each other, a series of processes including the step 101-1 and the step 101-2 is performed again (step 101). If the driver cannot be identified from the database 3 although this series of processes is repeated several times (for example, three times), the process progresses to the step 102. The process related to the face recognition of the driver and the identification of the driver is performed by the driver judgment unit 4B of the image processing unit 4 shown in FIG. 5. The storage region of the number variable to which the telephone number of the mobile telephone 7 is set is provided on the RAM 5-2 of the vehicle controller unit 5.

In the step 102, it is judged whether the telephone number of the mobile telephone 7 is set to the number variable. If set, it is judged whether the hands-free function exists again (step 103), and, if the hands-free function does not exist, the mobile telephone 7 of the driver is switched to the message recording mode (step 104) and the process is completed (step 108). Meanwhile, if the hands-free function exists, it is judged whether the driver drives the vehicle alone (step 105). If the driver drives the vehicle alone, the mobile telephone 7 of the driver is switched to the drive mode of the hands-free mode (step 106), and the process is completed (step 108). If the driver does not drive the vehicle alone, the mobile telephone 7 of the driver is switched to the drive mode of the message recording mode (step 107), and the process is completed (step 108).

The judgment as to whether the hands-free function exists is performed by the mode switching unit 5C of the vehicle controller unit 5, based on the information on the existence of the hands-free function acquired by the vehicle information acquiring unit 5A of the vehicle controller unit 5 shown in FIG. 5. The judgment as to whether the driver drives the vehicle alone is also performed by the mode switching unit 5C of the vehicle controller unit 5, but, in order to perform this judgment, the vehicle controller unit 5 need acquire the information on the existence of the fellow passenger. At this time, in the case of using the method for detecting whether the fellow passenger exists using the seating sensor for detecting whether a person sits on the seat in the vehicle, the vehicle controller unit 5 allows the vehicle information acquiring unit 5A to acquire the information on the existence of the fellow passenger from the seating sensor, and judges whether the driver drives the vehicle alone, based on the information on the existence of the fellow passenger. The switching to the message recording mode or the switching to the hands-free mode is performed by the mode switching unit 5C of the vehicle controller unit 5.

If the telephone number of the mobile telephone is not set to the number variable upon the judgment of the step 102, that is, the driver cannot be identified, the process is completed without switching (step 108).

If the process completion condition of the present process, such as the releasing of the driver from the seat belt and the stopping of the vehicle, is satisfied, the mode releasing process of FIG. 7(*b*) starts as the process for releasing the drive mode (step 200). The judgment as to whether the process completion condition is satisfied is performed by the process completion judgment unit 5D of the vehicle controller unit 5, based on the vehicle information acquired by the vehicle information acquiring unit 5A of the vehicle controller unit 5 shown in FIG. 5.

When the mode releasing process of FIG. 7(*b*) starts, it is judged whether the telephone number of the mobile telephone is set to the number variable by the previous telephone mode setting process (step 201). If set, the mobile telephone 7 corresponding to the telephone number, that is, the mobile telephone 7 of the driver which is switched to the message recording mode by the telephone mode setting process, is switched to the original mode (step 202) and the process is completed (step 203). If not set, the process is completed without switching (step 203). The switching to the original mode is also performed as the CPU 5-1 of the vehicle controller unit 5 shown in FIG. 5.

In the present embodiment, the configuration that the two conditions including the releasing of the driver from the seat belt and the stopping of the vehicle or the OFF or removal of the ignition key is set as the process completion condition related to the device for telephone countermeasure during the present process, that is, during driving of the vehicle controller unit 5 and, when the completion condition is satisfied after the mobile telephone 7 of the driver is switched to the drive mode such as the message recording mode, the drive mode is released, that is, the mobile telephone 7 of the driver returns to the state before setting the drive mode, is employed. Alternatively, a configuration for releasing the drive mode using a state that the driver cannot be identified by the driver judgment unit 4B of the image processing unit 4 by the elapse of a predetermined time as the process completion condition may be used. When such a configuration is employed, for example, a process for continuously monitoring the driver by the camera 1 after the driver is identified and periodically identifying the driver by the driver judgment unit 4B of the image processing unit 4 is performed. In the periodical identification of the driver, when the driver cannot be continuously identified and the time of the state that the driver cannot be identified exceeds a predetermined time, it is judged that the driver gets out of the vehicle and the drive mode of the mobile telephone 7 is released. In this configuration, the predetermined time is previously determined by an experiment and stored in the ROM 4-3 of the image processing unit 4 or the like as data. The judgment as to whether the driver cannot be identified by the elapse of the predetermined time is performed as the process of the CPU 4-1 of the image processing unit 4. When the driver cannot be identified by the elapse of the predetermined period, the information representing this state is transmitted from the image processing unit 4 to the vehicle controller unit 5, and the vehicle controller unit 5 releases the drive mode when such information is acquired.

Although, in the present embodiment, the database 3 is provided in the vehicle, a configuration for providing the database outside the vehicle such that it is hard for someone to read or rewrite the data and extracting the data from the database which is provided outside the vehicle by communication to identify the driver may be employed. In this case, since the data may be wiretapped upon the communication, it is preferable that the communication data is encrypted.

Even when the database is provided in the vehicle, it is preferable that the data such as the face data or the telephone number of the mobile telephone is encrypted to consider a data protecting countermeasure.

However, when the database 3 is provided outside the vehicle, it is necessary to pay attention to information leakage. As shown in FIG. 1, in the database 3, a pair of the face data 3-1 of the driver and the telephone number 3-2 of the mobile telephone is registered. When the database 3 is provided outside the vehicle, it is preferable that private information such as the face data 3-1 or the telephone number 3-2 of the mobile telephone is divided. This is because it is possible to reduce damage caused when the information leaks.

FIG. 14 is a view showing a case of separately providing the face data 3-1 of the driver and the telephone number 3-2 of the mobile telephone in the database 3 shown in FIG. 1. In this example, a face data correspondence table including a pair of the ID of an individual and face data corresponding to the individual and a mobile telephone number correspondence table including a pair of the ID of the individual and the identifier of the mobile telephone used by the individual are stored in the database which is provided outside the vehicle (not shown). Although the face of the driver who sits on the driving seat is photographed and the database 3 is searched, when the face data of the driver does not exist, it is preferable that external connection is performed through the wide area communication unit 6-6, the ID of the individual corresponding to the face data of the driver is searched for, and the database which is outside the vehicle is searched based on the ID obtained by searching. When this configuration is employed, since the face data of the individual and the identifier of the mobile telephone are separately stored as data, it is possible to reduce the damage due to the information leakage. A pair of data including the face data obtained by the searching and the identifier of the mobile telephone may be registered in the database 3. In this case, the pair of data may be temporarily registered and stored in the database 3 until the process for returning the mobile telephone of the driver, that is, the process for the switching to the original mode, is performed.

Although, in the above-described embodiment, the mobile telephone of the driver is set to the drive mode such as the message recording mode or the hands-free mode when the driver is recognized, the drive mode may be released or the communication may be performed by manipulation of the mobile telephone. That is, the mobile telephone may be manipulated such that the screen thereof is displayed. Accordingly, since the mobile telephone may operate even during driving and the screen may be viewed, the operation is not performed such that safety is sufficiently considered.

The configuration of the present embodiment is convenient for a user who observes the law, since, when the user sits on the driving seat, the mobile telephone is automatically switched to the drive mode such as the message recording mode, and, when the user sits on a seat other than the driving seat, the mobile telephone can be used in the normal mode which can perform the general communication. However, since the switching to the drive mode can be easily avoided, it is impossible to surely prevent the driver from using the mobile telephone during driving with respect to a user who ignores the law or danger and uses the mobile telephone. When the driver manipulates the mobile telephone during driving to return the mobile telephone, which has been in the drive mode such as the message recording mode, to the normal mode and uses the mobile telephone without using the hands-free mode, the driver becomes more inattentive compared with upon the general manipulation using the mobile telephone. This is because the manipulation for releasing the message recording mode, etc. is generally complicated.

As a means for solving the above-described problem and surely preventing the driver from using the mobile telephone during driving, when a face recognizing means authenticates the driver using the face image of the driver, that is, when the current driver of the vehicle is identified by the face authentication by the driver judgment unit 4B, an instruction for switching to a restricted state during driving may be sent to the mobile telephone of the driver such that the mobile telephone is set to a controlled state during driving based on this instruction. The "controlled state during driving" means that a keyboard of the mobile telephone cannot be manipulated such that information to be displayed on the display screen of the mobile telephone is not displayed, that is, the display screen is set to an invalid state. In addition, when a stable state that the damage is not caused although the communication is performed, such as the stopping or parking of the vehicle, is recognized, the restricted state during driving may be released. The judgment as to whether there is provided the stable state the damage is not caused although the communication is performed is performed by the CPU 5-1 of the vehicle controller unit 5, based on the vehicle information acquired by the vehicle information acquiring unit 5A.

The controlled state during driving means that the driver is inhibited from performing manipulation other than the driving or grasping the mobile telephone by his/her hand.

For example, start-up of a game application, display of a television broadcasting or alarm operation of an alarm watch must be inhibited. This is because these start up without manipulation.

When the manipulation using the hand or the close observation of the screen is not necessary, such as when the driver listens to an FM broadcasting or music of the mobile telephone, the manipulation which can be performed in the hands-free mode such as a voice command may be excluded.

FIG. 9 is a flowchart showing the process for switching to the message recording mode. According to this flowchart, first, the mobile telephone of the driver is switched to the message recording mode (step 9-1). Then, it is judged whether a hands-free device is mounted in the vehicle (step 9-2). When the hands-free device is not mounted (NO in the step 9-2), an instruction for switching to the controlled state during driving is sent to the mobile telephone of the driver to inhibit the mail or the application program of the mobile telephone from being used (step 9-3), the keyboard of the mobile telephone is locked (step 9-4), and the screen display of the mobile telephone is set to the invalid state (step 9-5). When the hands-free device is mounted in the vehicle (YES in the step 9-2), the steps 9-3 to 9-5 are skipped.

According to the above-described process for switching to the message recording mode of the FIG. 9, when the mobile telephone of the driver is completely switched to the message recording mode, since the mail or the application program of the mobile telephone is inhibited from being used, the keyboard of the mobile telephone is locked and the display screen of the mobile telephone is set to the invalid state, it is possible to sure prevent the driver from using the mobile telephone during driving.

FIG. 10 is a flowchart showing a process for switching to the hands-free mode by the Bluetooth. According to this flowchart, first, voice input/output of the mobile telephone is switched through Bluetooth (step 10-1). Then, it is judged whether a hands-free device corresponding to the Bluetooth is mounted in the vehicle (step 10-2). When the hands-free device corresponding to the Bluetooth is mounted in the vehicle (YES in the step 10-2), an instruction for switching to the controlled state during driving is sent to the mobile telephone of the driver, the keyboard of the mobile telephone is locked (step 10-3), and the screen display is set to the invalid state (step 10-4). When the hands-free device corresponding to the Bluetooth is not mounted in the vehicle (NO in the step 10-2), the steps 10-3 and 10-4 are skipped.

According to the above-described process for switching to the hands-free mode of the FIG. 10, when the mobile telephone of the driver is switched to the hands-free mode, since the keyboard of the mobile telephone is locked and the display screen of the mobile telephone is set to the invalid state, it is possible to surely prevent the driver from using the mobile telephone during driving.

The above-described embodiment employs a configuration that the information on the mobile telephone 7 used by the driver (the telephone number 3-2 of the mobile telephone, in the example of FIG. 1) and the face data 3-1 of the driver are registered in the database 3 for each of the drivers and the mobile telephone is switched to the drive mode such as the message recording mode based on the registered information as the telephone countermeasure during driving. To this end, when the information is not registered in the database 3 or false information is registered in the database, the switching to the drive mode is not performed and thus the driver is allowed to use the mobile telephone during driving. Particularly, it is impossible to efficiently prevent the false information from being intentionally registered in the database 3 so as to illegally avoid the switching to the drive mode.

As a countermeasure for a non-registration problem that the information of the mobile telephone 7 is not registered, the following countermeasures A, B and C are considered. In the countermeasure, the mobile telephone of the passenger (including the driver; hereinafter, the same is true) is detected. As a detecting method, the telephone number or the ID of the mobile telephone is acquired from the mobile telephone by the local area communication means such as the Bluetooth, the mobile telephone is identified, and it is determined that the identified mobile telephone is the mobile telephone of the passenger when the mobile telephone is moved together with the vehicle.

<Countermeasure A>

When the passenger is only the driver and the number of the mobile telephones is one, the mobile telephone is considered to the mobile telephone of the driver and thus is set to the controlled state during driving.

<Countermeasure B>

Before driving, the mobile telephone is switched to a registration mode, that is, a mode for registering the telephone number 3-2 of the mobile telephone 7 used by the driver in the database 3 to prompt the registration. To this end, when the driver possesses the mobile telephone and the mobile telephone is registered in the database 3, the non-registration problem is solved. Meanwhile, although the driver possesses the mobile telephone and the mobile telephone is switched to the registration mode, when the mobile telephone is not registered in the database 3, the mobile telephone of the driver is set to the above-described restricted state during driving to inhibit the use of the mobile telephone. When the passenger other than the driver possesses the mobile telephone, the below-described configuration is employed.

When the passenger who possesses the mobile telephone is family and registers the information on the mobile telephone, the non-registration problem is solved. Since the passenger does not sit on the driving seat, the mobile telephone can be used in the normal mode. When a passenger who sat on a passenger seat sits with the registered mobile telephone on the driving seat later, the mobile telephone is automatically switched to the drive mode such as the hands-free mode or the message recording mode. If the information on the mobile telephone is not registered, the registration is prompted. If registered, the mobile telephone is switched to the drive mode such as the hands-free mode or the message recording mode. When the information on the mobile telephone is not registered, the unregistered mobile telephone is set to the controlled state during driving such that the keyboard of the mobile telephone cannot be manipulated, the display screen is set to the invalid state, that is, the state that the information to be displayed on the display screen is not displayed, and the mobile telephone cannot be used.

<Countermeasure C>

A configuration for allowing the information on the mobile telephone to be temporarily registered as a guest is employed. Even in this case, when the information on the mobile telephone is not registered, the mobile telephone cannot be used as described above. In the registration of the mobile telephone of the guest, a valid period may be set such that the information of the guest is automatically removed.

In the above-described embodiment, although the mobile telephone has the hands-free function or the mobile hands-free device is provided, the mobile telephone or the hands-free device cannot be efficiently used. As a method for solving this problem, (A) since the communication can be admitted if the manipulation is not performed, the manipulation is detected through the local area communication means and the communication without the manipulation is admitted or (B) when a mobile hands-free device which pairs with the mobile telephone exists, the local area wireless link is not allowed to be realized.

FIG. 8 is a flowchart showing the operation of the mobile telephone when the mobile telephone is set to the hands-free mode in the local area communication unit 6-5 which functions as the Bluetooth. In this flowchart, first, the hands-free device corresponding to the Bluetooth is searched for by the Bluetooth (step 801). Here, when the hands-free device is not found (NO in the step 801), the process returns to the step 800. Meanwhile, when the hands-free device is found (YES in the step 802), the connection with the hands-free device is tried by the Bluetooth (step 803). When the connection is not admitted (NO in the step 804), the process returns to the step 800, and, when the connection is admitted (YES in the step 804), the current mode of the mobile telephone is confirmed (step 805). Here, when the mode is the hands-free mode (YES in the step 807), not the message recording mode (NO in the step 806), the communication method of the mobile telephone is switched to the hands-free mode (step 808). Meanwhile, when the mode is the message recording mode (YES in the step 806), the communication method of the mobile telephone is switched to the message recording mode (step 809).

After the communication method of the mobile telephone is switched to the hands-free mode or the message recording mode, the releasing of the connection of the Bluetooth is checked (step 810). When the connection of the Bluetooth is released (YES in the step 811), the communication method of the mobile telephone returns to the normal mode for performing the normal communication (step 812). Meanwhile, when the connection is not released (NO in the step 811), the process returns to the step 810, and the mobile telephone is set to the connection releasing standby state.

When the mode is not the message recording mode (NO in the step 806) or the hands-free mode (NO in the step 807) in the confirmation of the step 805, the connection of the Bluetooth is released (step 813) and the other hands-free device is searched for by the Bluetooth (step 814) and the process returns to the step 800.

FIGS. 11 and 12 are flowcharts showing the process contents when a plurality of mobile telephones exists in the vehicle and is detected by the Bluetooth to switch the modes thereof. Among them, the flowchart of FIG. 11 shows the processing operation including the face authentication and the registration confirmation of the vehicle controller unit 5 and the flowchart of FIG. 12 shows the controlling operation of the local area communication unit 6-5 which functions as the local area communication means (Bluetooth).

The processing operation including the face authentication and the registration confirmation of FIG. 11 and the controlling operation of the local area communication unit 6-5 of FIG. 12 are performed in parallel. In the following description, "face recognition start-up condition" means a condition that face authentication starts up, such as the start-up of the engine and the fastening of the seat belt.

In the flowchart of FIG. 11, first, the face recognition start-up condition is confirmed (step 11-1). When the face recognition start-up condition is satisfied (YES in the step 11-2), the face of the driver is recognized (step 11-3) and it is judged whether the recognized face data of the driver is matched to the face data of the driver which is registered in the database 3 in the vehicle (step 11-4). If both the face data are matched to each other (YES in the step 11-4), the telephone number of the mobile telephone corresponding to the face data is extracted from the database 3 to be set to the number variable (step 11-5). Meanwhile, if both the face data are not matched to each other (NO in the step 11-4), it is confirmed whether the face data is registered in the external database using the wide area communication unit 6-6 (step 11-6). When the unshown external database is searched using the wide area communication unit 6-6 and it is judged whether the recognized face data of the driver is matched to the face data registered in the external database (step 11-7). If both the face data are matched to each other (YES in the step 11-7), the telephone number of the mobile telephone corresponding to the face data is extracted from the external database to be set to the number variable (step 11-5). Meanwhile, when both the face data are not matched to each other (NO in the step 11-7), the number variable is reset (step 11-8).

As described above, after the telephone number of the mobile telephone is set to the number variable or the number variable is reset, the face recognition start-up condition is confirmed again (step 11-9). If the face recognition start-up condition is satisfied (YES in the step 11-10), the process returns to the step 11-3 and the loop for recognizing the face is repeated. This is because the driver may be changed even after the telephone number of the mobile telephone is set to the number variable. Accordingly, the loop for recognizing the face is repeated on the condition that the face recognition start-up condition is satisfied. When the face recognition start-up condition is not satisfied during repeating the loop for recognizing the face (NO in the step 11-10), it is checked whether an ignition switch (power source) of the vehicle is turned off (step 11-11). If turned off (YES in the step 11-11), the process is completed, and, if not turned off (NO in the step 11-11), the ignition switch is set to an OFF standby state and the process is completed at a point of time when the ignition switch is turned off.

When the face recognition start-up condition is not satisfied (NO in the step 11-2), the process returns to the step 11-1 in order to confirm the face recognition start-up condition again.

In the flowchart of FIG. 12, first, the mobile telephone which can be connected by the Bluetooth is searched for (step 12-1). If the mobile telephone which can be connected does not exist (NO in the step 12-2), the process returns to the step 12-1. Meanwhile, when the mobile telephone which can be connected exists (YES in the step 12-2), the telephone number of the mobile telephone is compared with the telephone number set to the number variable (step 12-3) and it is judged whether the information of the mobile telephone is registered by the driver (step 12-4). As the compared result, if both the telephones are matched to each other, it is judged that the information on the mobile telephone is registered by the driver (YES in the step 12-4) and the instruction for switching to the hands-free mode is given to the mobile telephone (step 12-5). Meanwhile, if both the telephone numbers are not matched to each other, it is judged that the information on the mobile telephone is not registered by the driver (NO in the step 12-4) and the user of the mobile telephone is requested to confirm whether the mobile telephone is registered or not (step 12-6). If the information on the mobile telephone is registered in correspondence with the request of the registration confirmation (YES in the step 12-7), the user of the mobile telephone is inquired as to whether the information on the mobile telephone is temporarily registered or not (step 12-8). When the confirmation that the information is temporarily registered is given with respect to the inquiry (YES in the step 12-9), the process progresses to the step 12-5 and the instruction for switching to the hands-free mode is given to the mobile telephone. Meanwhile, when the confirmation that the information is permanently registered is given, instead of the temporary registration (NO in the step 12-9), the information on the mobile telephone (telephone number of the mobile telephone in the example of FIG. 1) is registered in the database 3 (step 12-10) and the process progresses to the step 12-5, which the instruction for switching to the hands-free mode is given to the mobile telephone. In the step 12-6, when the registration confirmation of the mobile telephone is requested but the response to the request is not received, that is, when the user of the mobile telephone rejects the registration of the information on the mobile telephone (NO in the step 12-7), the instruction for switching to the message recording mode is given to the mobile telephone (step 12-11) and the other mobile telephone which can be connected by the Bluetooth is searched for (step 12-12) and the process returns to the first step 12-1.

After the mobile telephone is switched to the hands-free mode by the instruction of the step 12-5, it is judged whether the Bluetooth is disconnected or not (step 12-13). If the Bluetooth is disconnected (YES in the step 12-13), the process returns to the step 12-1 and thus the controlling operation of the local area communication unit 6-5 which functions as the above-described local area communication means (Bluetooth) is repeated. Meanwhile, if the Bluetooth is not disconnected yet (NO in the step 12-13), it is checked whether the ignition switch of the vehicle is turned off (step 12-14). If turned off (YES in the step 12-14), the process is completed, and, if not turned off (NO in the step 12-14, the ignition switch is set to an OFF standby state and the process is completed at a point of time when the ignition switch is turned off. However, when the ignition switch of the vehicle is turned off, the power source of the local area communication unit 6-5 is turned off. Accordingly, the mobile telephone detects the disconnection of the Bluetooth (connection releasing) and returns to the normal mode which can perform the communication in the normal mode after the disconnection is confirmed.

A configuration for storing the data of the mobile telephone for a predetermined period even in the case of the temporary registration, that is, the temporary use, of the mobile telephone may be employed. For example, when the vehicle temporarily stops once in a resting place in an express highway and runs again, it is possible to prevent an inquiry about the temporary registration from taking place again.

Since it cannot be judged whether the mobile telephone of a communication counterpart exists in the vehicle or outside the vehicle only using the Bluetooth, it may be judged that the mobile telephone exists when the connection is possible by the Bluetooth even during driving. By this configuration, when the connection with the mobile telephone which exists in a near region at the outside of the vehicle is performed by the Bluetooth, this connection is cut by the start of driving, and thus it can be estimated that the mobile telephone is outside the vehicle by the cut of the connection due to the start of driving.

It may be considered that the connection using the Bluetooth is accidentally cut according to the wave state although the mobile telephone exists in the vehicle. Although the connection is cut, since the configuration for searching for the mobile telephone again is employed in the flowchart of FIG. 8 or FIG. 14, the cut problem is not caused.

Since the configuration of the process shown by the flowchart of FIG. 12 considers a person who illegally uses the mobile telephone without registering the information on the mobile telephone, the mobile telephone which is registered has a specification which can be used only in the hands-free mode. In this specification, a configuration for confirming whether the mobile telephone is used in the message recording mode when registering the information on the mobile telephone and setting the mobile telephone to be used in the message recording mode may be employed.

Although, in the process configuration shown in PAD of FIG. 7, the persons except the person who sits on the driving seat can use the mobile telephone in the normal mode, the process configuration shown in the flowchart of FIG. 12 is slightly inconvenient compared with the configuration of FIG. 7. Accordingly, in order to improve the convenience, a portion of the configuration shown in the flowchart of FIG. 12 may be changed as described below.

CHANGED CONFIGURATION EXAMPLE

In the process configuration of the flowchart of FIG. 12, the judgment of the step 12-4, that is, the judgment as to whether the information on the mobile telephone is registered by the driver, is changed to judgment as to whether the information on the mobile telephone is registered by the driver or a person except the driver. In addition, after the registration to the database 3 is performed in the step 12-10 or the judgment in the changed step 12-4 is YES, a step of judging whether the mobile telephone is the mobile telephone of the driver is inserted. If the mobile telephone is the mobile telephone of the driver, the process progresses to the step 12-5, which the instruction for switching the hands-free mode is given to the mobile telephone, and, if the mobile telephone is not the mobile telephone of the driver, the process returns to the first step 12-1.

According to the changed process, the mobile telephone which is registered by the person except the driver can be used in the normal mode.

In addition to the above-described changed configuration, the following configurations may be employed as a means for improving the convenience.

Configuration Example 1

By detecting the face of a person who sits on a passenger seat or a back seat except the driving seat, it is judged that the person is not the driver and thus the communication thereof is allowed to be performed in the normal mode.

Configuration Example 2

By registering information that a person who cannot drive the vehicle, such as a child or a person who does not possess a driver's license, cannot drive the vehicle in the database, the mobile telephone of the person is allowed to be used in the normal mode.

Configuration Example 3

By registering a mode to be used in the database, the mobile telephone is automatically set to the registered mode according to the individual's taste.

Although the above-described countermeasure is performed, in the process configuration shown in the PAD of FIG. 7 or the changed configuration example, illegality such as a case where the driver uses the child's mobile telephone may be occurred.

In order to prevent such illegality, a person who directly manipulates and uses the mobile telephone is identified using personal bio identification information of the driver and, when the person sits on the driving seat, the mobile telephone is switched to the restricted state during driving. It can be detected who directly manipulates the mobile telephone as described below.

A person who manipulates the mobile telephone is identified using the face image of the user photographed by the camera of the mobile telephone. The face authentication may be performed by the mobile telephone, the in-vehicle unit, the other device or a device connected through network.

If the fingerprint authentication of a person who drives the vehicle is detected in a mode except the hands-free mode, it is possible to prevent illegality by employing the configuration for switching the mobile telephone to the restricted state during driving.

As the configuration for preventing the illegality, a configuration for specifying a communication device used when the ID of the person who sits on the driving seat is used on the network and setting the mobile telephone to the restricted state during driving when the specified communication device is the mobile telephone in the vehicle may be employed.

If the image in which the mobile telephone is used in the driving seat is detected, the mobile telephone may be set to be the restricted state during driving by connection of the Bluetooth. Accordingly, it is possible to prevent the illegality.

BRIEF DESCRIPTION OF THE DRAWINGS

FIG. 7(*a*) is a problem analysis diagram (PAD) showing a telephone mode setting process executed by the device of FIG. 1 and FIG. 7(*b*) is a PAD showing a mode releasing process executed by the same device.

REFERENCE NUMERALS

Figure 1:
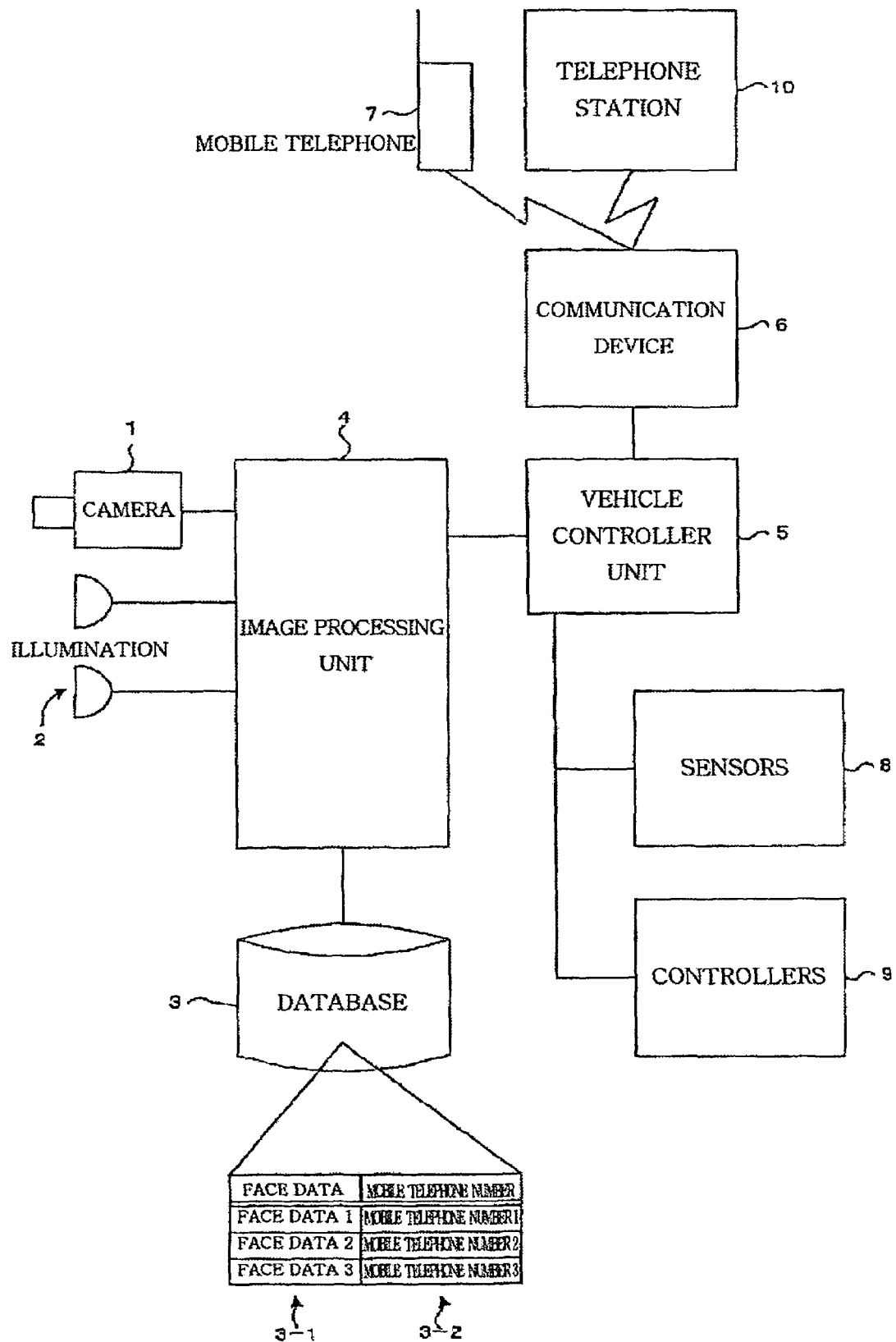
FIG. 1 is a view showing an entire configuration of a device for telephone countermeasure during driving according to an embodiment of the present invention.
Figure 2:
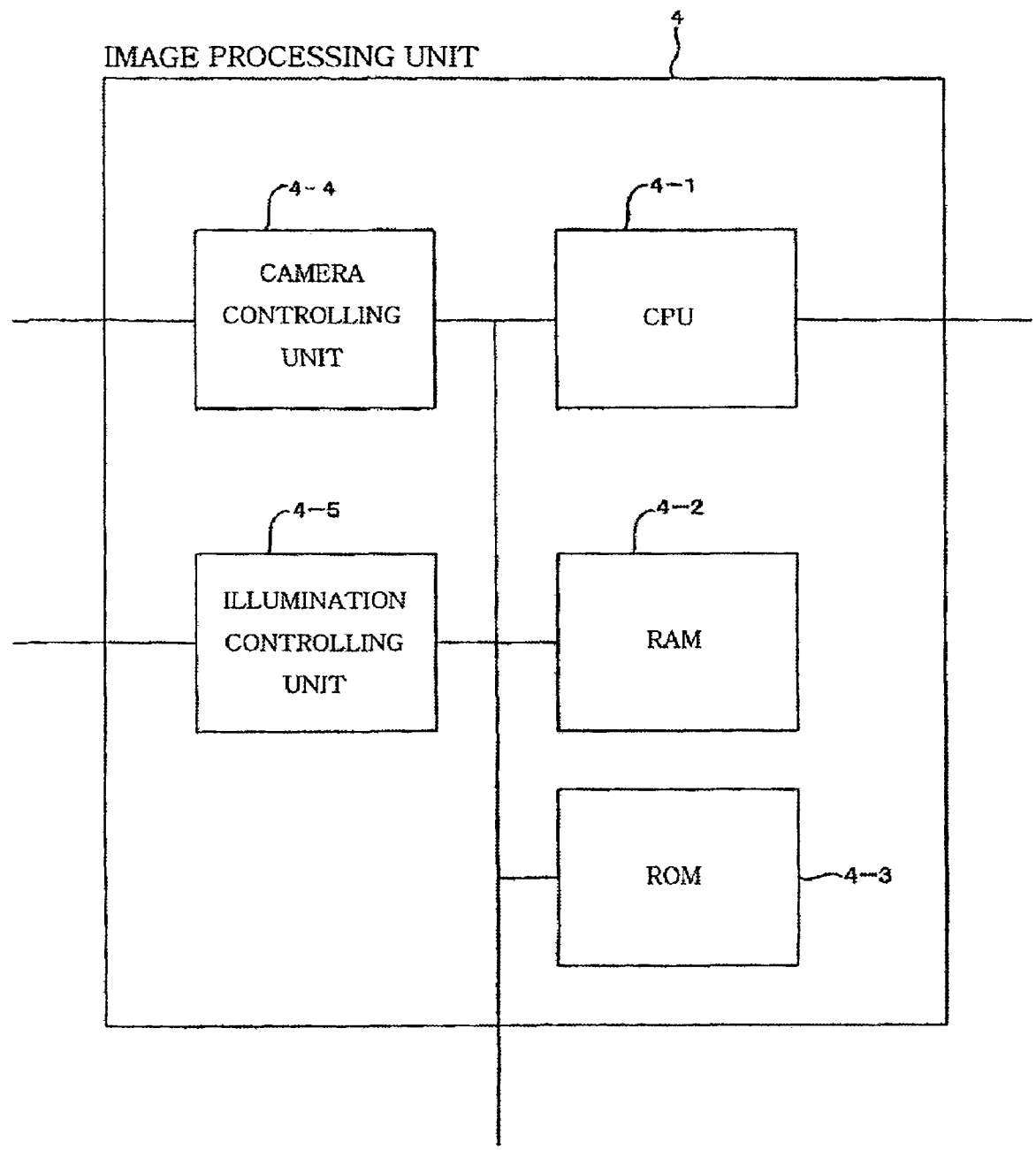
FIG. 2 is a view showing a hardware configuration of an image processing unit used in the device of FIG. 1.
Figure 3:
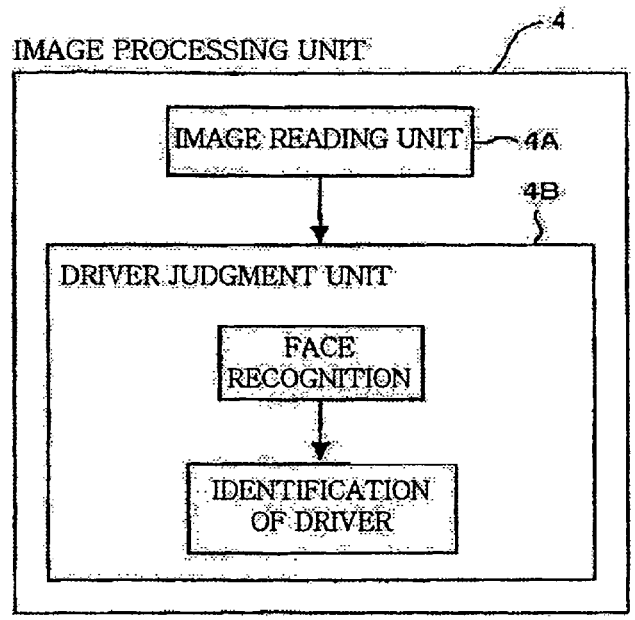
FIG. 3 is a functional block diagram of the image processing unit used in the device of FIG. 1.
Figure 4:
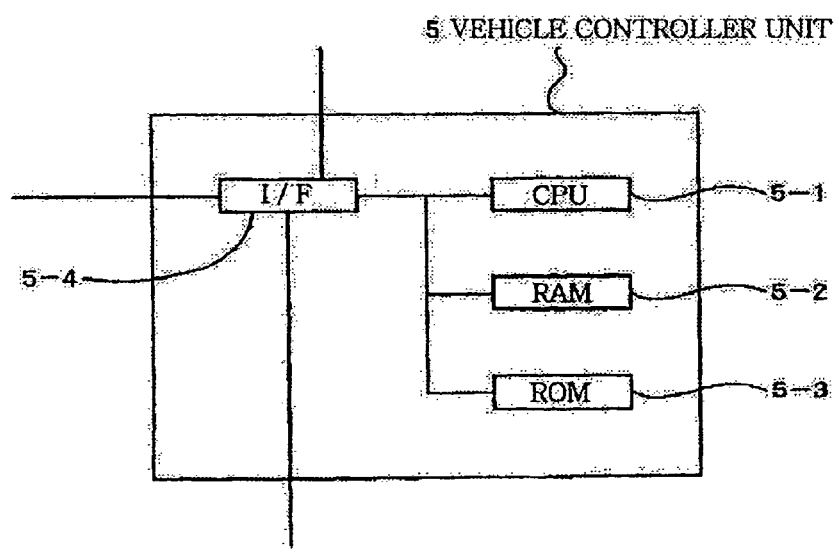
FIG. 4 is a view showing a hardware configuration of a vehicle controller unit used in the device of FIG. 1.
Figure 5:
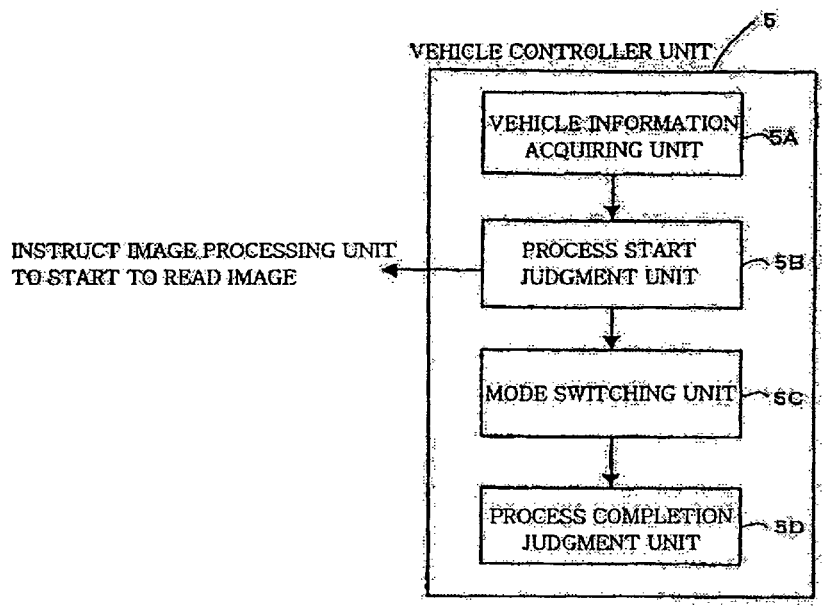
FIG. 5 is a functional block diagram of the vehicle controller unit used in the device of FIG. 1.
Figure 6:
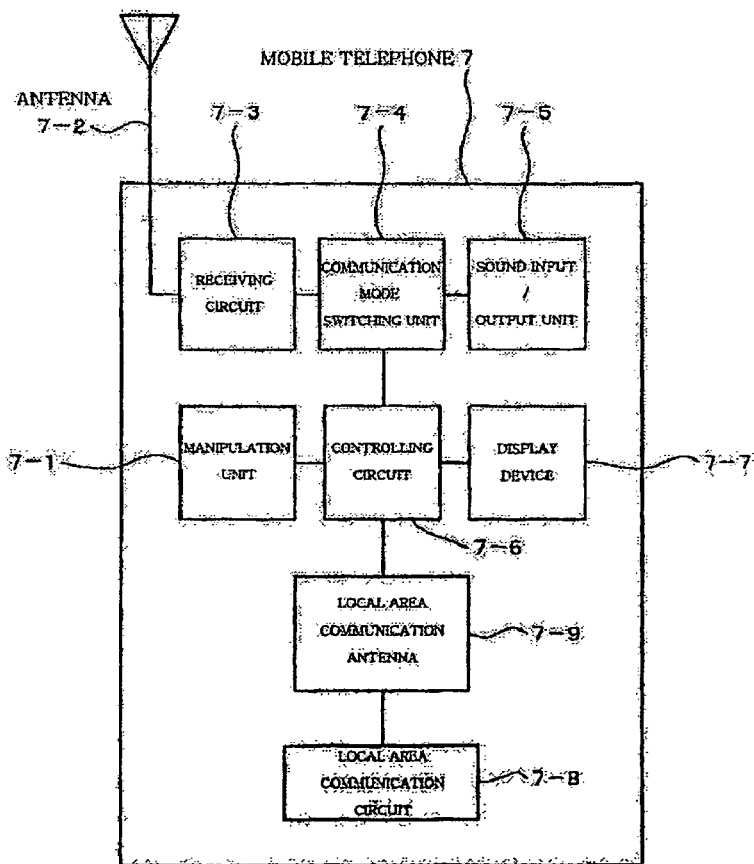
FIG. 6 is a functional block diagram of a mobile telephone.
Figure 8:
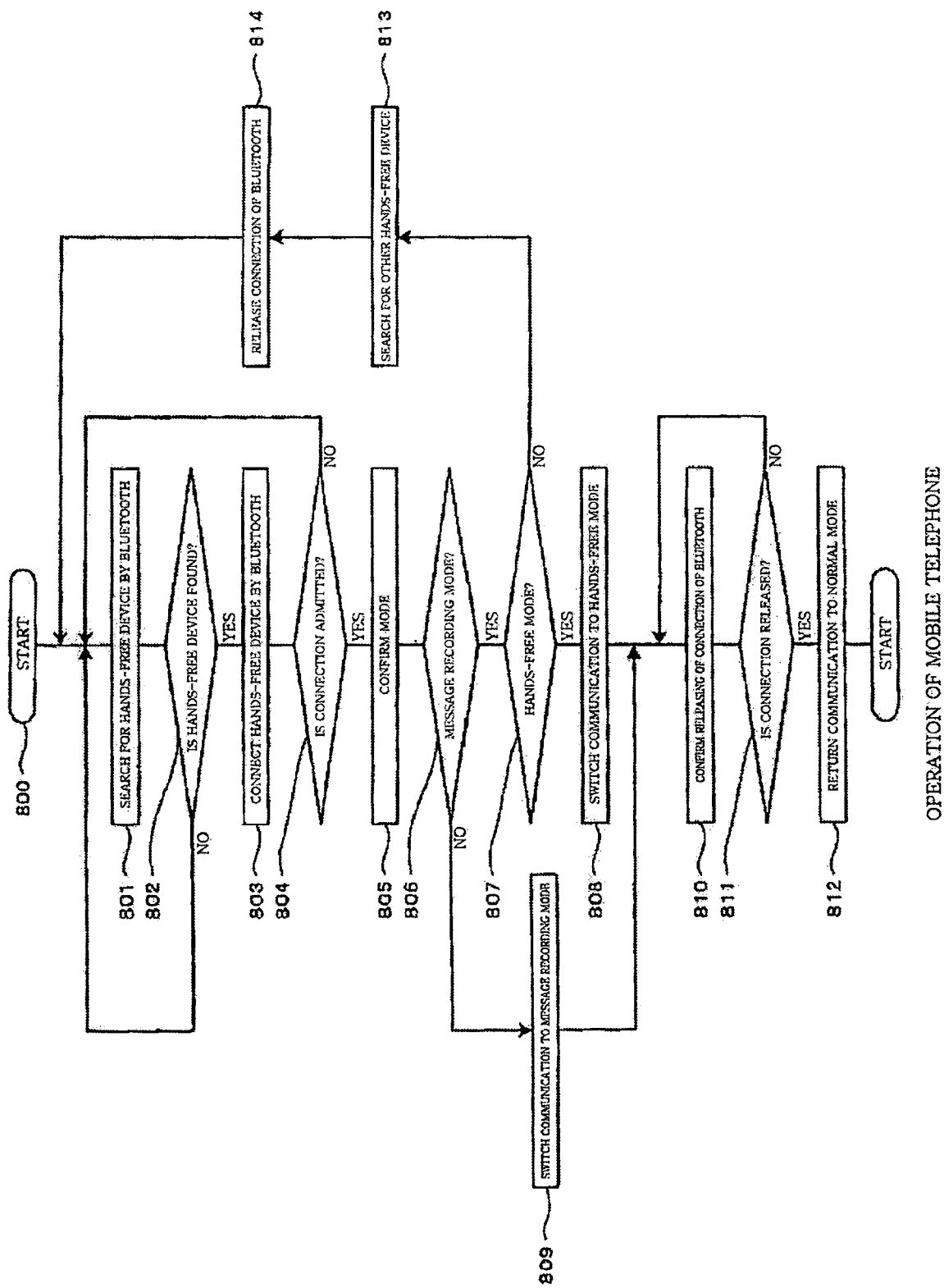
FIG. 8 is a flowchart showing an operation of a mobile telephone when the mobile telephone is set to a hands-free mode by Bluetooth.
Figure 9:
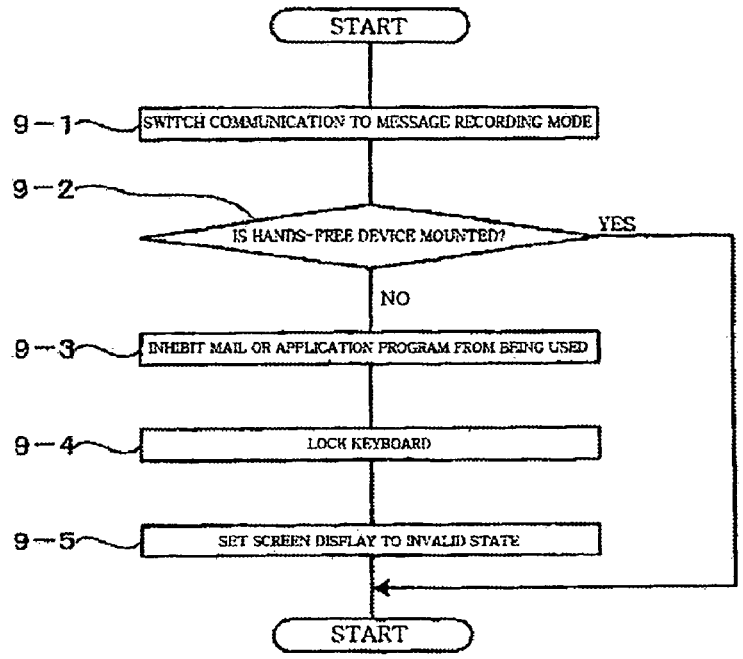
FIG. 9 is a flowchart showing a process for switching to a message recording mode.
Figure 10:
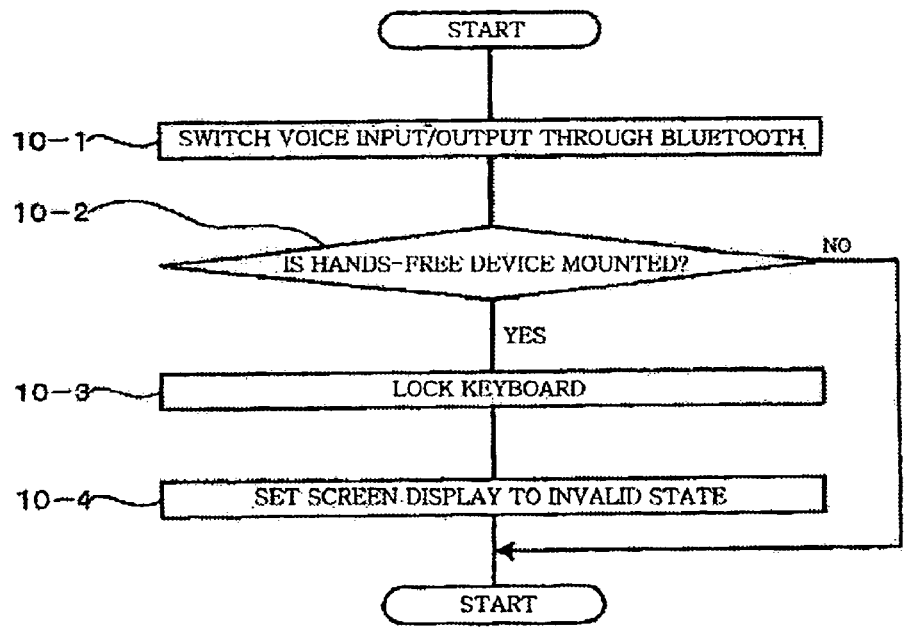
FIG. 10 is a flowchart showing a process for switching to the hands-free mode by the Bluetooth.
Figure 11:
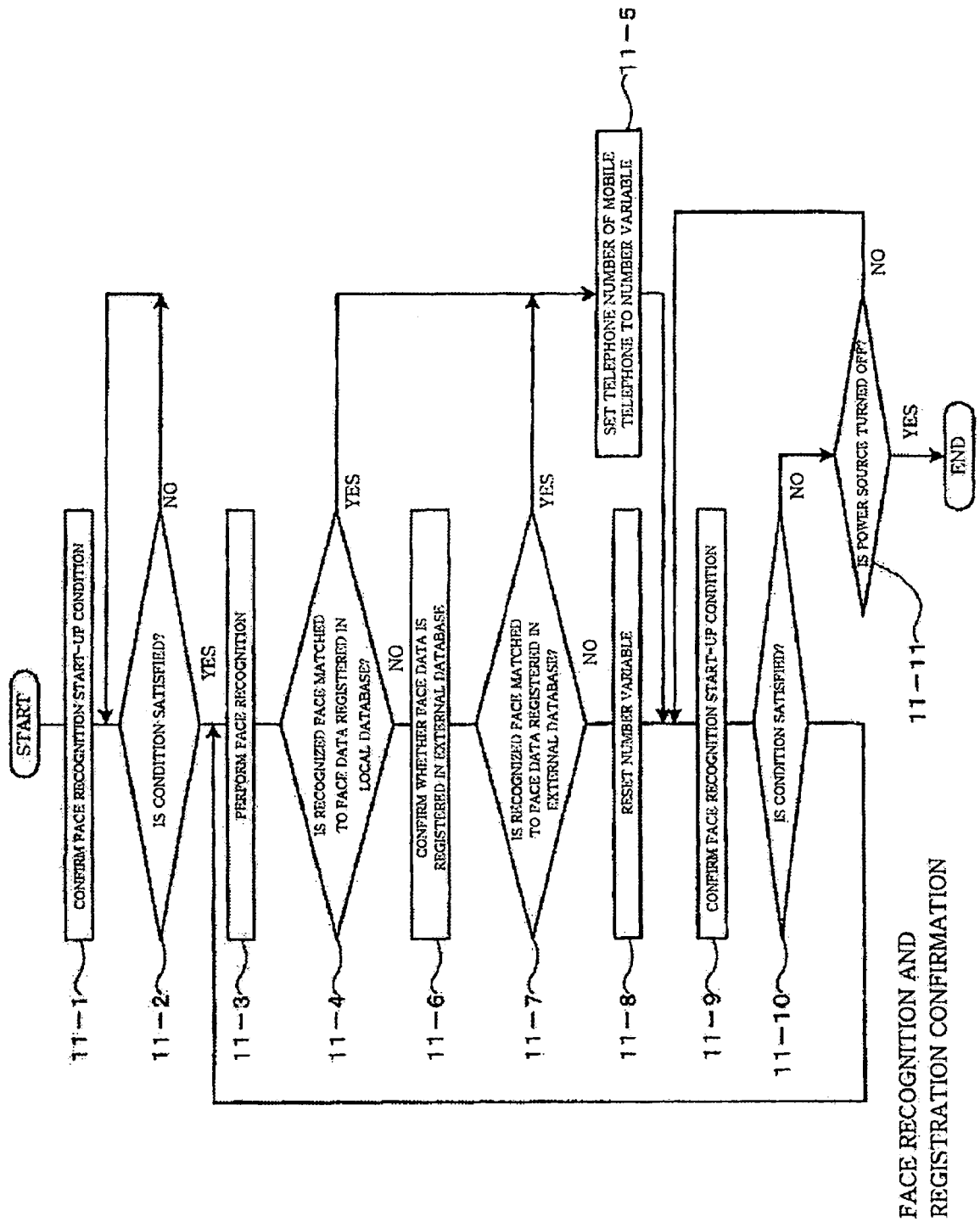
FIG. 11 is a flowchart showing a process operation for performing face authentication and registration confirmation in the vehicle controller unit as process contents in a case where a plurality of mobile telephones exist in a vehicle and are detected by the Bluetooth to switch the modes thereof.
Figure 12:
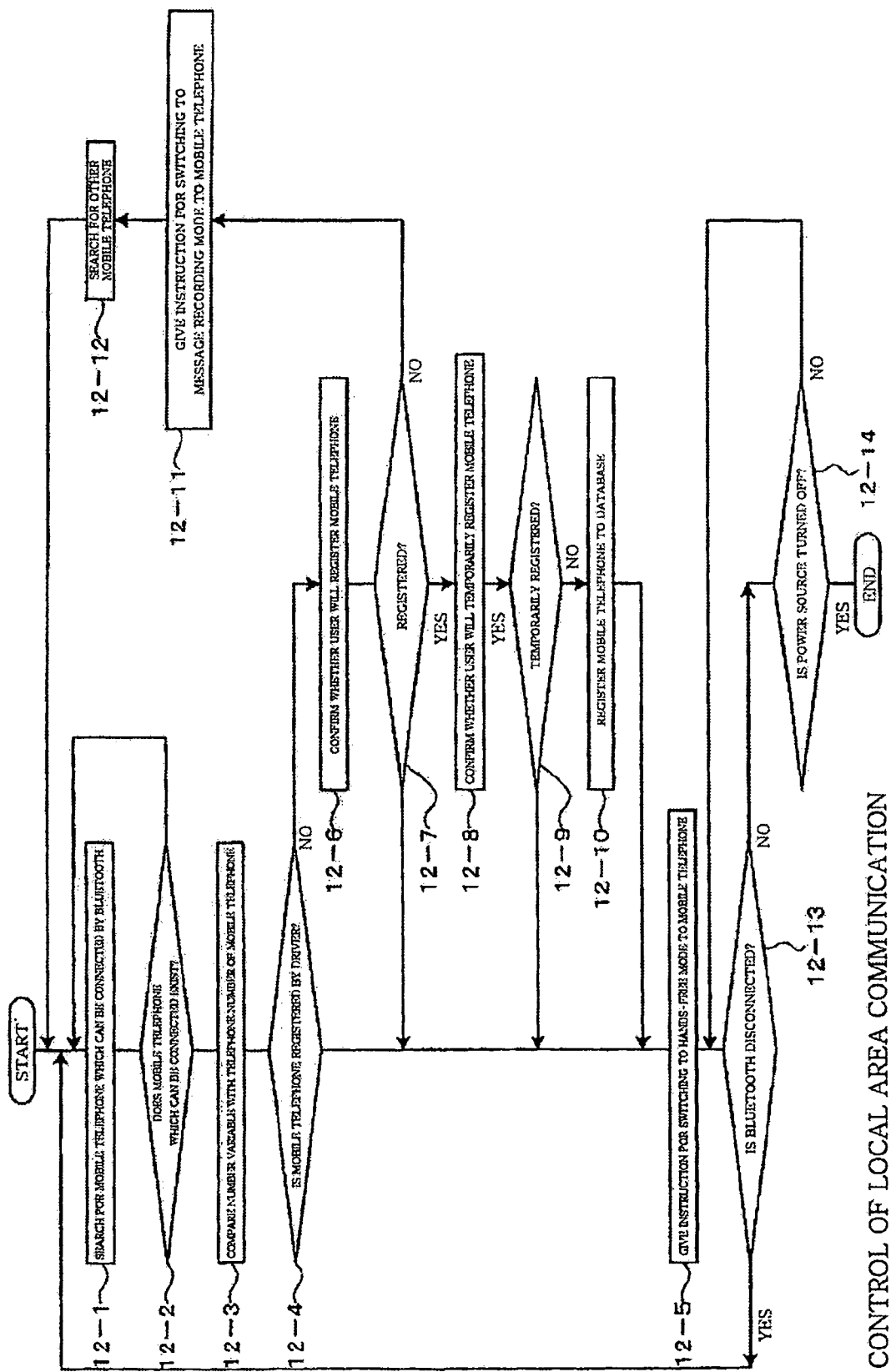
FIG. 12 is a flowchart showing a controlling operation of a local area communication unit which functions as the Bluetooth as process contents in a case where a plurality of mobile telephones exist in a vehicle and is detected by the Bluetooth to switch the modes thereof.
Figures 13, 14:
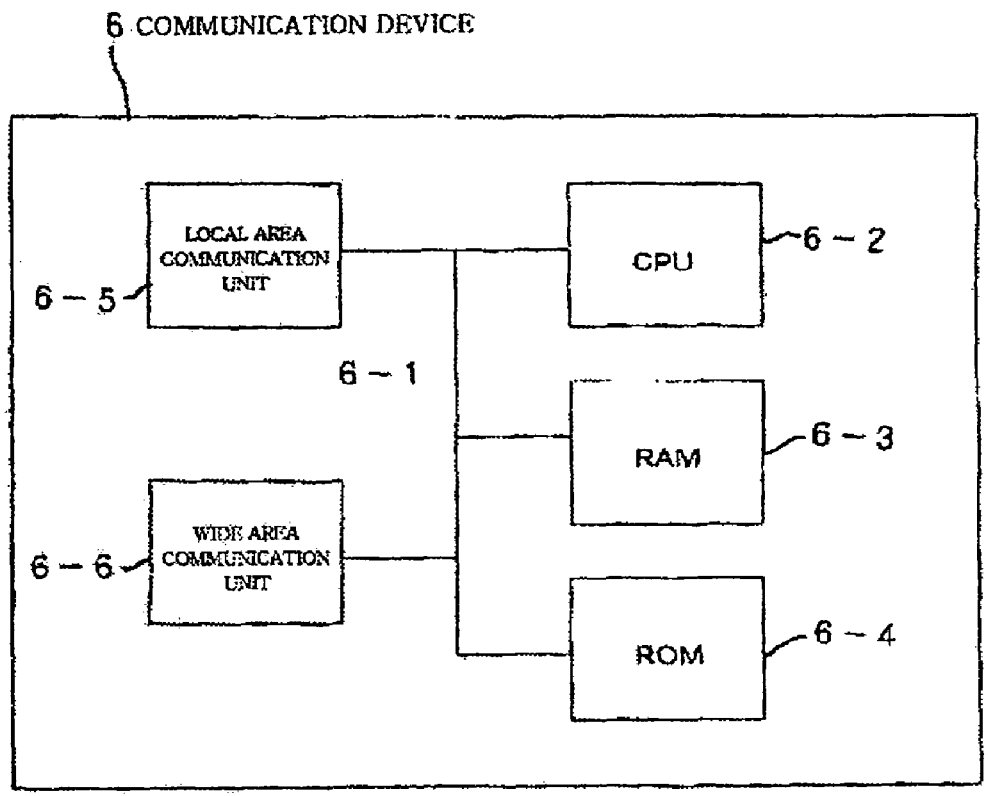
FIG. 13 is a view showing a configuration of a communication device shown in FIG. 1.
FIG. 14 is a view showing a case of separately providing face data of a driver and the telephone number of a mobile telephone in a database shown in FIG. 1.

1: camera
2: illumination
3: database
3-1: face data
3-2: telephone number
4: image processing unit
4-1: CPU
4-2: RAM
4-3: ROM
4-4: camera controlling unit
4-5: illumination controlling unit
4A: image reading unit
4B: driver judgment unit
5: vehicle controller unit
5A: vehicle information acquiring unit
5B: process start judgment unit 5C: mode switching unit
5D: process completion judgment unit
6: communication device
7: mobile telephone
7-1: manipulation unit
7-2: antenna
7-3: receiving circuit
7-4: communication mode switching unit
7-5: sound input/output unit
7-6: controlling circuit
7-7: display device
7-8: local area communication antenna
7-9: local area communication circuit
8: sensors
9: controllers
10: telephone station

The invention claimed is:

1. A device for telephone countermeasure during driving, comprising:
a database which registers face data of a driver and identification information of a mobile communication device used by the driver for each of a plurality of drivers;
a driver identifying means which identifies current driver of a vehicle in the database by face recognition; and
a mode switching means which extracts the identification information of the mobile communication device used by the driver identified by the driver identifying means and switches the mobile communication device of the driver to a drive mode using the identification information,
wherein the mode switching means applies only to the mobile communication device in possession of the current driver of the vehicle.

2. The device for telephone countermeasure during driving according to claim 1, wherein the drive mode includes at least one of a message recording mode and a hands-free mode and the mode switching means switches the mobile communication device of the driver from a mode prior to the drive mode to the drive mode.

3. The device for telephone countermeasure during driving according to claim 2, wherein, when the mobile communication device of the driver is switched to the drive mode, the mobile communication device is set to a controlled state during driving.

4. The device for telephone countermeasure during driving according to claim 1, wherein, when the mobile communication device of the driver is switched to the drive mode, the mobile communication device is set to a controlled state during driving.

5. The device for telephone countermeasure during driving according to claim 1, wherein, when face data of a driver which is recognized for face authentication does not exist in a database of the device, information for identifying a mobile telephone corresponding to the recognized driver is examined in an external database using a wide area communication device, and the mobile telephone is set to a drive mode when the mobile telephone can be identified.

6. The device for telephone countermeasure during driving according to claim 1, wherein, when face data of a driver which is recognized for face authentication does not exist in a database of the device, information for identifying a mobile telephone corresponding to the recognized driver is examined in an external database using a wide area communication device, and information on the corresponding mobile telephone is requested to be registered when the mobile telephone cannot be identified.

7. The device for telephone countermeasure during driving according to claim 1, wherein, when face data of a driver recognized for face authentication does not exist in a database of the device, information for identifying a mobile telephone corresponding to the recognized driver is examined from an external database using a wide area communication device, and the mobile telephone is set to a controlled state during driving when the mobile telephone cannot be identified and information on the mobile telephone is not registered.

8. A device for telephone countermeasure during driving, comprising:
a database which registers face data of a driver and identification information of a mobile communication device used by the driver for each of a plurality of drivers; and
a driver identifying means which identifies current driver of a vehicle in the database by face recognition,
wherein the identification information of the mobile communication device used by the driver identified by the driver identifying means is extracted from the database, the mobile communication device of the driver is switched to a drive mode using the identification information, and the drive mode of the mobile communication device is released when the driver cannot be identified by the driver identifying means after the elapse of a predetermined time, and
wherein the switching and the releasing apply only to the mobile communication device in possession of the current driver of the vehicle.

9. The device for telephone countermeasure during driving according to claim 8, wherein, when the mobile communication device of the driver is switched to the drive mode, the mobile communication device is set to a controlled state during driving.

10. A method for telephone countermeasure during driving, using a database which registers face data of a driver and identification information of a mobile communication device used by the driver for each of a plurality of drivers, and a driver identifying means which identifies current driver of a vehicle in the database by face recognition, the method comprising:
extracting the identification information of the mobile communication device used by the driver identified by the driver identifying means from the database, and
switching the mobile communication device of the driver to a drive mode using the identification information,
wherein the switching applies only to the mobile communication device in possession of the current driver of the vehicle.

11. The method for telephone countermeasure during driving according to claim 10, wherein, when the mobile communication device of the driver is switched to the drive mode, the mobile communication device is set to a controlled state during driving.

12. A method for telephone countermeasure during driving, using a database which registers face data of a driver and identification information of a mobile communication device used by the driver for each of a plurality of drivers, and a driver identifying means which identifies current driver of a vehicle in the database by face recognition, the method comprising:
extracting the identification information of the mobile communication device used by the driver identified by the driver identifying means from the database,
switching the mobile communication device of the driver to a drive mode using the identification information, and releasing the drive mode of the mobile communication device when the driver cannot be identified by the driver identifying means, wherein the switching and the releasing apply only to the mobile communication device in possession of the current driver of the vehicle.

13. The method for telephone countermeasure during driving according to claim 12, wherein, when the mobile communication device of the driver is switched to the drive mode, the mobile communication device is set to a controlled state during driving.

* * * * *